United States Patent [19]
Yamagishi

[11] Patent Number: 5,561,650
[45] Date of Patent: Oct. 1, 1996

[54] REPRODUCTION APPARATUS REPRODUCING VIDEO, BUT NOT AUDIO, FROM A RECORDING MEDIUM TO PROVIDE A MULTI-PICTURE IMAGE

[75] Inventor: Youichi Yamagishi, Yokohama, Japan

[73] Assignee: Canon Kabushiki Kaisha, Tokyo, Japan

[21] Appl. No.: 238,786

[22] Filed: May 6, 1994

Related U.S. Application Data

[63] Continuation of Ser. No. 645,482, Jan. 24, 1991, abandoned.

[30] Foreign Application Priority Data

Jan. 26, 1990 [JP] Japan .......................................... 2-17462

[51] Int. Cl.⁶ ............................................................ G11B 7/00
[52] U.S. Cl. .................... 369/48; 369/58; 386/106
[58] Field of Search ................................. 358/22, 30, 102, 358/335, 343, 342, 310, 339; 369/32, 48, 49, 53, 58, 54; 360/9.1, 19.1, 14.1, 27, 33.1, 36.2

[56] References Cited

U.S. PATENT DOCUMENTS

| | | | |
|---|---|---|---|
| 4,574,319 | 3/1986 | Konishi | 358/335 |
| 4,763,208 | 8/1988 | Kawamura et al. | 360/33.1 |
| 4,791,496 | 12/1988 | Kageyama et al. | 358/342 |
| 4,905,077 | 2/1990 | Ishii | 358/335 |
| 4,920,424 | 4/1990 | Hosaka et al. | 358/343 |
| 5,010,498 | 4/1991 | Miyata | 358/442 |
| 5,050,003 | 9/1991 | Horii et al. | 358/342 |
| 5,053,898 | 10/1991 | Hashimoto et al. | 369/58 |

FOREIGN PATENT DOCUMENTS

| | | |
|---|---|---|
| 0223423 | 5/1987 | European Pat. Off. ....... H04N 5/781 |
| 62-177750 | 8/1987 | Japan . |
| 63-199647 | 8/1988 | Japan . |
| 63-282959 | 11/1988 | Japan . |
| 1035771 | 2/1989 | Japan . |

*Primary Examiner*—Georgia Y. Epps
*Assistant Examiner*—Muhammad N. Edun
*Attorney, Agent, or Firm*—Fitzpatrick, Cella, Harper & Scinto

[57] ABSTRACT

A reproduction apparatus conducts reproduction of data from a recording medium on which picture information and audio information related to the picture information are recorded for each block in a mixed state. The reproduction apparatus is designed to display only pictures on a multi-picture screen by reproducing information recorded in the individual blocks except for that information recorded in blocks in which the sound information is recorded when the information recorded in the individual blocks is to be reproduced for the multi-picture display.

17 Claims, 8 Drawing Sheets

| 1 | 2 | 3 | 4 | 5 |
|---|---|---|---|---|
| 6 | 7 | 8 | 9 | 10 |
| 11 | 12 | 13 | 14 | 15 |

FIG. 6(b)

| 26 | 27 | 28 | 29 | 30 |
|---|---|---|---|---|
| 31 | 32 | 33 | 34 | 35 |
| 36 | | | | |

FIG. 6(c)

| 1 | 2 | 3 | 4 | 5 |
|---|---|---|---|---|
| 6 | 7 | 8 | 9 | 10 |
| 11 | 12 | 13 | 14 | 15 |
| 26 | 27 | 28 | 29 | 30 |
| 31 | 32 | 33 | 34 | 35 |

FIG. 6(d)

| 36 | | | | |
|---|---|---|---|---|

REPRODUCTION APPARATUS REPRODUCING VIDEO, BUT NOT AUDIO, FROM A RECORDING MEDIUM TO PROVIDE A MULTI-PICTURE IMAGE

This application is a continuation of application Ser. No. 07/645,482 filed Jan. 24, 1991, now abandoned.

BACKGROUND OF THE INVENTION

1. Field of the Invention

The present invention relates to a reproduction apparatus capable of discriminating between video and audio signals.

2. Description of the Related Art

Examples of known reproduction apparatuses include one for recording on a medium using the still video format. This format, conforming to the standard of CP-3901 "Still Video Floppy Disc System" of "Standard Electronic Industries Association of Japan" held by Technical Committee on Video Recording in September in 1988, can be used to record and reproduce not only images but also sounds for a predetermined period of time. That is, sound which is time-compressed and affixed with a flag and a control code is frequency-modulated and then recorded on one of the tracks of a video floppy. Recording of sound therefore reduces the number of tracks on which pictures can be recorded. The control code for an audio track (the track on which sound is recorded) can contain the track No. of the corresponding video track (on which the corresponding picture is recorded), by which the picture and sound can be simultaneously reproduced in one-to-one correspondence.

The known methods of retrieving the pictures recorded on a video floppy include the display of the recorded pictures in a multi-picture format, e.g., the display of the picture frames in a 5×5 array (25 frames). Since there are fifty tracks on a video floppy, pictures recorded on all the tracks can be displayed on two multi-picture screens each containing an array of 5×5 frames. In a case where hard copies of the multi-picture screens are produced using a video printer, two prints are enough to check the contents of a single video floppy.

However, in the conventional multi-picture display method, the first multi-picture screen is created from the pictures recorded from the first to twenty-fifth tracks, and the second multi-picture screen is created from the pictures recorded from the twenty-sixth to fiftieth tracks. Hence, even if the number of video tracks is 25 or less, when all the pictures recorded on the floppy are to be checked, two multi-picture screens must be prepared except when all the pictures are recorded from the first to twenty-fifth tracks. This is very inconvenient. Furthermore, in a case where hard copies of the multi-picture screens are produced, two prints must always be obtained, which is troublesome and wasteful.

The aforementioned problem may occur with reproduction apparatus other than that for still video.

SUMMARY OF THE INVENTION

An object of the present invention is to provide a reproduction apparatus which enables the user to readily observe a plurality of images.

Another object of the present invention is to provide a reproduction apparatus which enables reproduction of unnecessary images to be eliminated.

To achieve the above objects, the present invention provides, in one aspect thereof, a reproduction apparatus for conducting reproduction of data from a recording medium on which picture information and sound information related to the picture information are recorded for each block, in a mixed state. The reproduction apparatus is designed to display only pictures on a multi-picture screen by reproducing information recorded in the individual blocks except for that information recorded in blocks in which the sound information is recorded when the information recorded in the individual blocks is to be reproduced for the multi-picture display.

According to another aspect of the present invention, a reproducing apparatus includes reproduction means for reproducing video signals and signals other than the video signals which are recorded on a medium. Means are provided for creating a directory for the medium on the basis of the data reproduced by said reproduction means. A memory is supplied for storing only the video signals representing a plurality of pictures on the basis of said directory.

According to a further aspect of the present invention, a reproducing apparatus comprises means for determining a number of a specified type of signals in a plurality of types of signals recorded on a medium. A memory is provided for storing at least the specified type of signals, and control means are provided for controlling the storage of the memory in accordance with the determination made by said determining means.

Objects and advantages of the invention will become apparent from the following description taken in connection with the accompanying drawings.

BRIEF DESCRIPTION OF THE DRAWINGS

FIGS. 5(a)–5(c) and 6(a)–6(d) show examples of a multi-picture display screen;

DETAILED DESCRIPTION OF THE PREFERRED EMBODIMENTS

Embodiments of the present invention will be described below with reference to the accompanying drawings.

Figure 1:
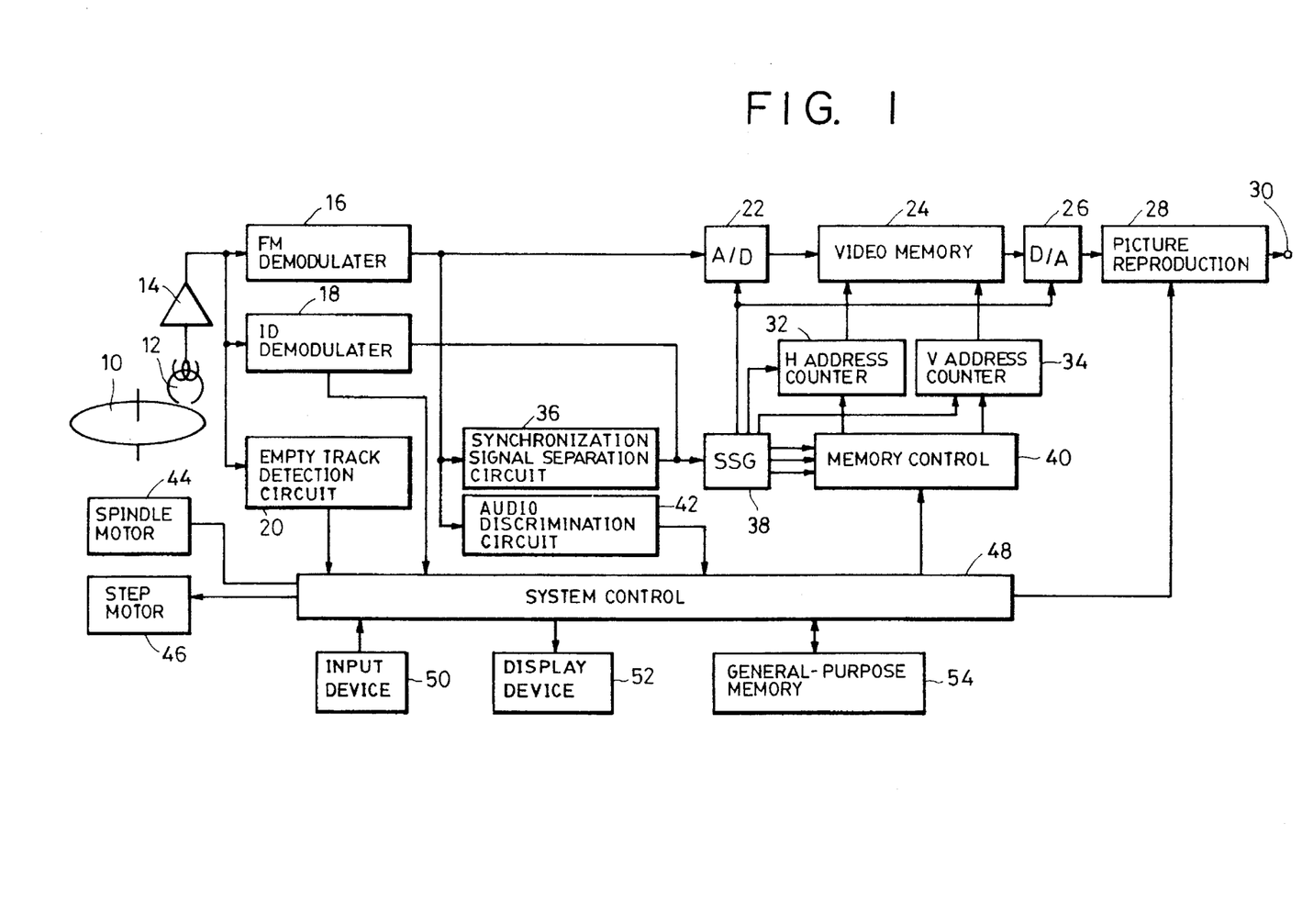
FIG. 1 is a block diagram of a first embodiment of the present invention.

FIG. 1 is a block diagram of a first embodiment of the present invention.

A reproduction apparatus includes a magnetic disk 10 which is a still video floppy, a magnetic head 12, a pre-amplifier 14, an FM demodulater 16, an ID information demodulater 18 for demodulating ID information, an empty track detection circuit 20 for detecting an empty track i.e., a non-recorded track, an A/D converter 22, a video memory 24, a D/A converter 26, a picture reproduction circuit 28, and a picture output terminal 30.

The reproduction apparatus further includes a horizontal address counter 32 for the video memory 24, a vertical address counter 34 for the video memory 24, a synchronization signal separation circuit 36 for separating a synchronizing signal from the output of the FM demodulater 16, a synchronizing signal generation circuit (SSG) 38 for generating clocks for the individual components in response to the synchronizing signal separated by the synchronization signal separation circuit 36, a memory control circuit 40 for controlling the video memory 24 through the address counters 32 and 34, an audio discrimination circuit 42 for discriminating the audio signal recorded on a reproducing track, (i.e., for determining whether or not the signal recorded on the reproducing track is sound,) a spindle motor 44 for rotating the magnetic disk 10, a step motor 46 for feeding the magnetic head 12 in the radial direction of the magnetic disk 10, a system control circuit 48 for controlling the entirety of the apparatus, an input device 50 for inputting predetermined instructions to the system control circuit 48, a display device 52, and general-purpose memory 54 for storing various data.

The operation of the first embodiment according to the present invention will be described below with reference to FIGS. 1, 2, 3 and 4. After initialization (S1), the system control unit 48 waits for and confirms loading of the magnetic disk 10 (S2), and then conducts pre-scanning (S3).

Figure 3:
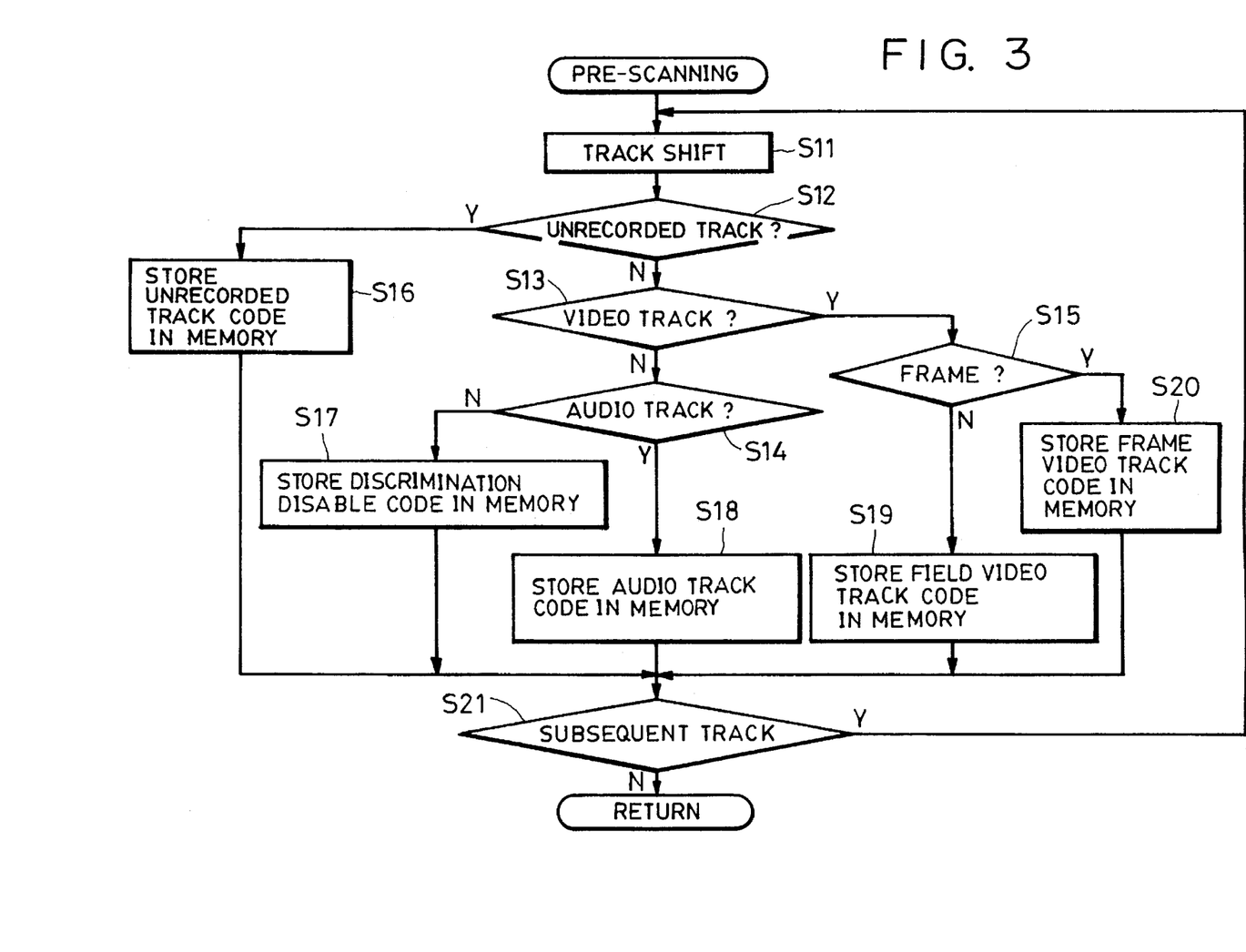

FIG. 3 is the flowchart of the pre-scanning. In pre-scanning, the system control circuit 48 rotates the magnetic disk 10 by means of the spindle motor 44 at a predetermined speed, and moves the magnetic head 12 to the first track by means of the step motor 46 (S11). The output of the magnetic head 12 located at the first track is supplied through the pre-amplifier 14 to the FM demodulater 16, the ID demodulater 18 and the empty track detection circuit 20. The output of the FM demodulater 16 is input to the synchronization signal separation circuit 36 and to the audio discrimination circuit 42.

The system control circuit 48 determines from the output of the empty track detection circuit 20 whether or not the track is a recorded one (S12). If the track is a non-recorded track (empty), the system control circuit 48 sets a non-recorded track code and stores it in the memory 54 together with the track No. (S16). If the track is a recorded one, the system control circuit 48 determines from the output of the ID demodulater 18 whether or not the track is a video track (S13). If the track is a video track, the system control circuit 48 determines from the output of the ID demodulater 18 whether the track is a field or frame recorded track (S15). If the track is a frame recorded track, the system control circuit 48 sets a frame picture track code and stores it in the memory 54 together with the track No. (S20). If the track is a field recorded track, a field picture track code is set and stored in the memory 54 together with the track No. (S19).

When the track is neither a video track nor a non-recorded track, the system control circuit 48 determines from the output of the audio discrimination circuit 42 whether or not the track is an audio track (S14). If the track is an audio track, the system control circuit 48 sets an audio track code and stores it in the memory 54 together with track No. (S18). If the track is not an audio track, a discrimination disable code is set in the memory 54 together with track No. (S17).

The above-described discrimination is conducted over all the tracks (S21).

Figure 2:
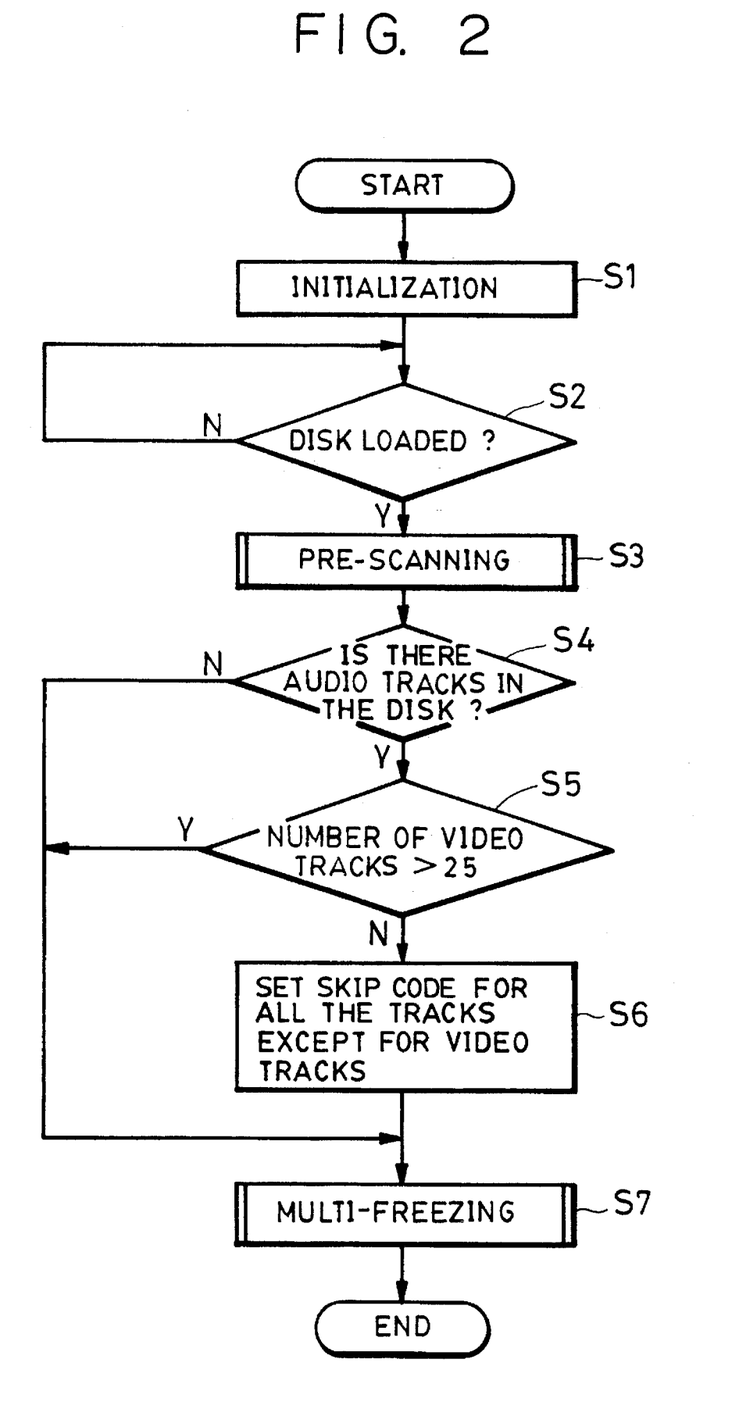
FIGS. 2, 3 and 4 are flowcharts of the first embodiment of the present invention.

In the pre-scanning (S3), the recorded state of all the tracks is stored in the memory 54, that is, a directory is created. Thereafter, the system control circuit 48 refers to the memory 54 and thereby determines whether or not there is an audio track (S4). If there is no audio track, the system control circuit 48 performs multi-freezing (see FIG. 4) (S7).

If there is an audio track, the system control circuit 48 determines whether or not the number of field or frame video tracks is more than 25 screens (S5). If more than 25 field or frame video tracks are present, multi-freezing is per-formed (S7). If the number of field or frame video tracks is not more than 25, the system control circuit 48 stores in the memory 54 track Nos. which are neither field nor frame video tracks together with the skip codes (S6), and then performs multi-freezing (S7).

Figure 4:
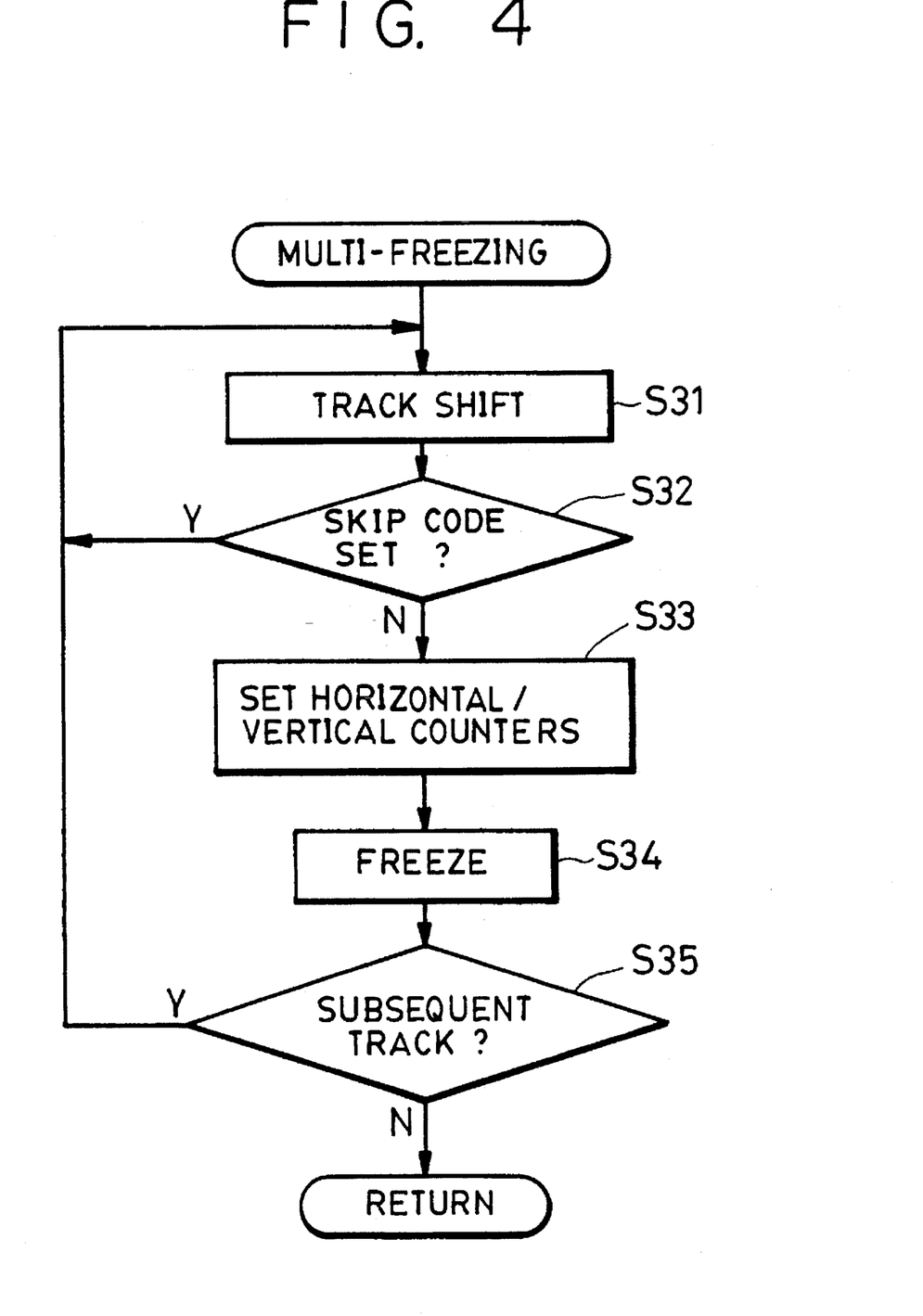

FIG. 4 is a flowchart of the multi-freezing (S7). During the multi-freezing, the SSG 38 supplies a clock to the A/D converter 22 and to the D/A converter 26, a horizontal address clock to the horizontal address counter 32 and a vertical address clock to the vertical address counter 34 in accordance with the synchronizing signal separated by the synchronization signal separation circuit 36. Also, the SSG 38 supplies a clock, a horizontal synchronizing signal, and a vertical synchronizing signal to the memory control circuit 40.

The system control circuit 48 moves the magnetic head 12 to the first track (S31). Thereafter, the system control circuit 48 determines whether or not the track is to be skipped by examining the skip code stored in the memory 54 (S32). If the track is to be skipped (S32), the system control circuit 48 moves the magnetic head 12 to a subsequent track (S31). If the track is not to be skipped, the system control circuit 48 sets a predetermined address in the horizontal and vertical address counters 32 and 34 through the memory control circuit 40 (S33), and thereby freezes an image to be reproduced in the video memory 24 (S34). Thereafter, the system control circuit 48 determines whether or not the magnetic head 12 is moved to a subsequent track (S35). If the magnetic head 12 is to be moved, the process returns to step S31. If the answer is negative, multi-freezing is ended.

In this way, the video signals reproduced from the video tracks are frozen in the form of a multi-picture in the video memory 24. The system control circuit 48 sets through the memory control circuit 40 a predetermined address in the horizontal address counter 32 and in the vertical address counter 34, by which the picture data in the video memory 24 is read out in accordance with the address in the horizontal address counter 32 and that in the vertical address counter 34. The read-out picture data is converted into an analog signal by the D/A converter 26, and the obtained analog signal is processed by the picture reproduction circuit 28 before it is output from the video output terminal 30. That is, the data on the plurality of pictures constituting the multi-picture screen is read out substantially simultaneously.

The display area of the tracks other than the video and audio tracks is muted to white or black.

Figure 5A:
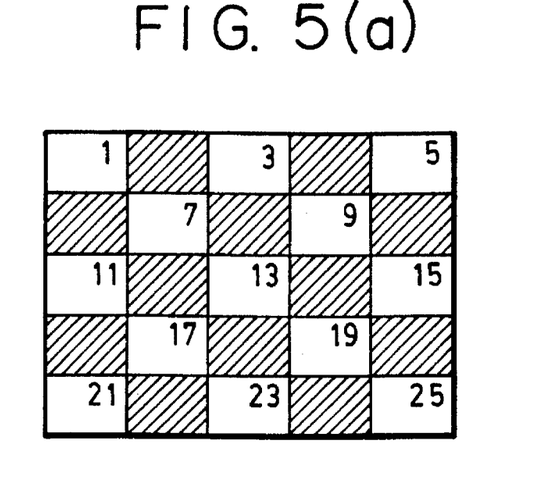
Figure 5B:
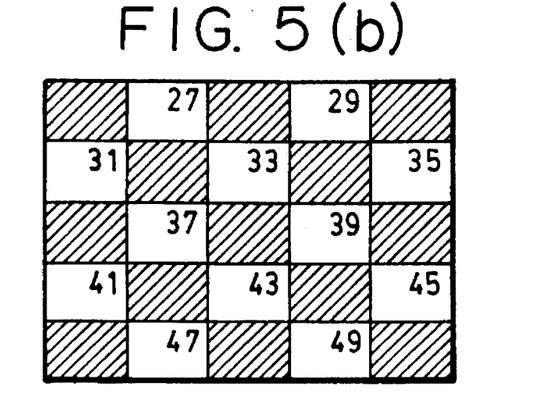
Figure 5C:
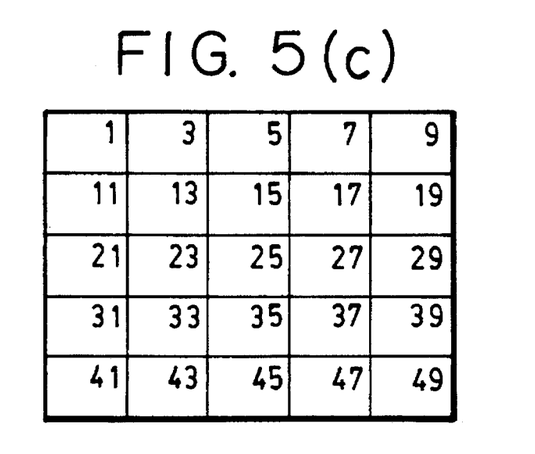

FIG. 5 shows an example of the multi-freezing in which the video and audio tracks are in one-to-one correspondence. Whereas two multi-picture screens are required in the conventional technique, as shown in FIGS. 5(a) and (b), all the video signals are shown on one multi-picture screen in this embodiment, as shown in FIG. 5(c).

Figure 6A:
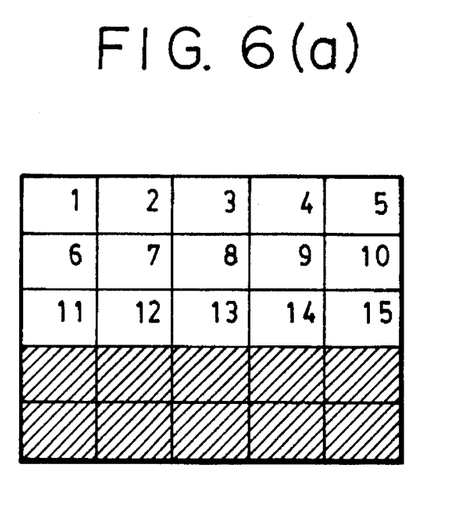
Figure 6B:
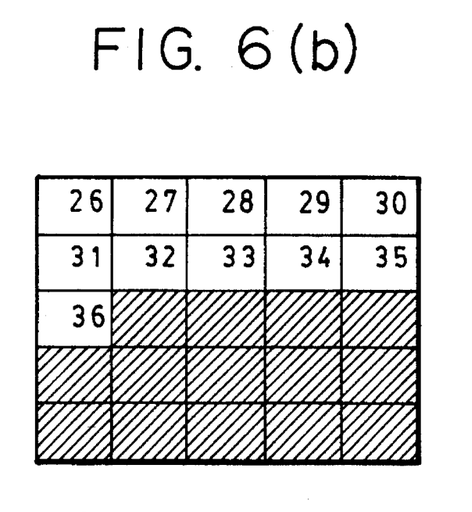
Figure 6C:
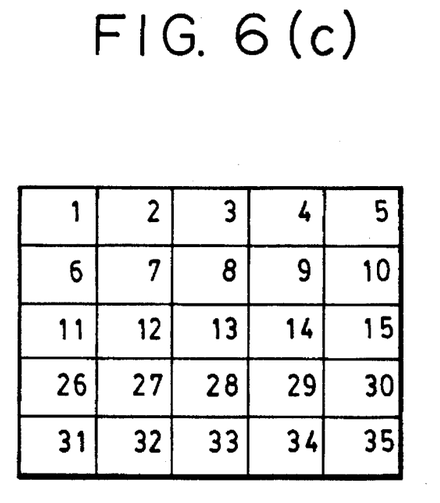
Figure 6D:
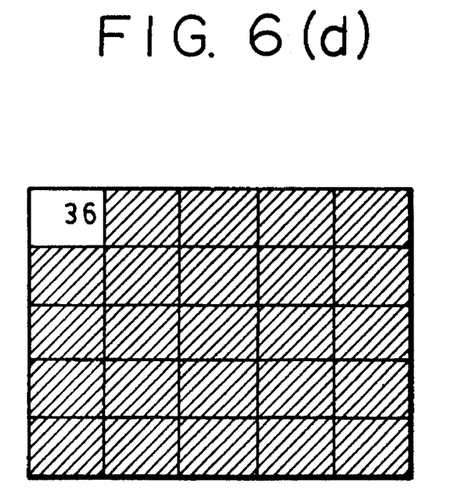

When there are no audio tracks, if non-recorded tracks or erased tracks are present, the signals stored on the tracks are displayed on the multi-picture screens at positions corresponding to their track Nos., as shown in FIGS. 6(a) and (b). This makes checking of the usage of the individual tracks easy. In that case, the signals stored on the tracks may be packed by skipping the non-recorded tracks and displayed on the multi-picture screens, as shown in FIGS. 6(c) and (d). However, this requires two screens, and makes checking of the usage of the tracks difficult.

As will be understood from the foregoing description, it is possible according to the present embodiment to display the pictures recorded on a recording medium on a reduced number of multi-picture screens. Furthermore, since the multi-picture screen of the video tracks is created without the non-recorded tracks being omitted, checking of the usage of the recording medium can be facilitated.

A second embodiment of the present invention will now be described with reference to FIG. 7 which shows the same apparatus as that shown in FIG. 1 except that the FIG. 7 apparatus is capable of outputting image data to a printer.

Figures 7, 8:
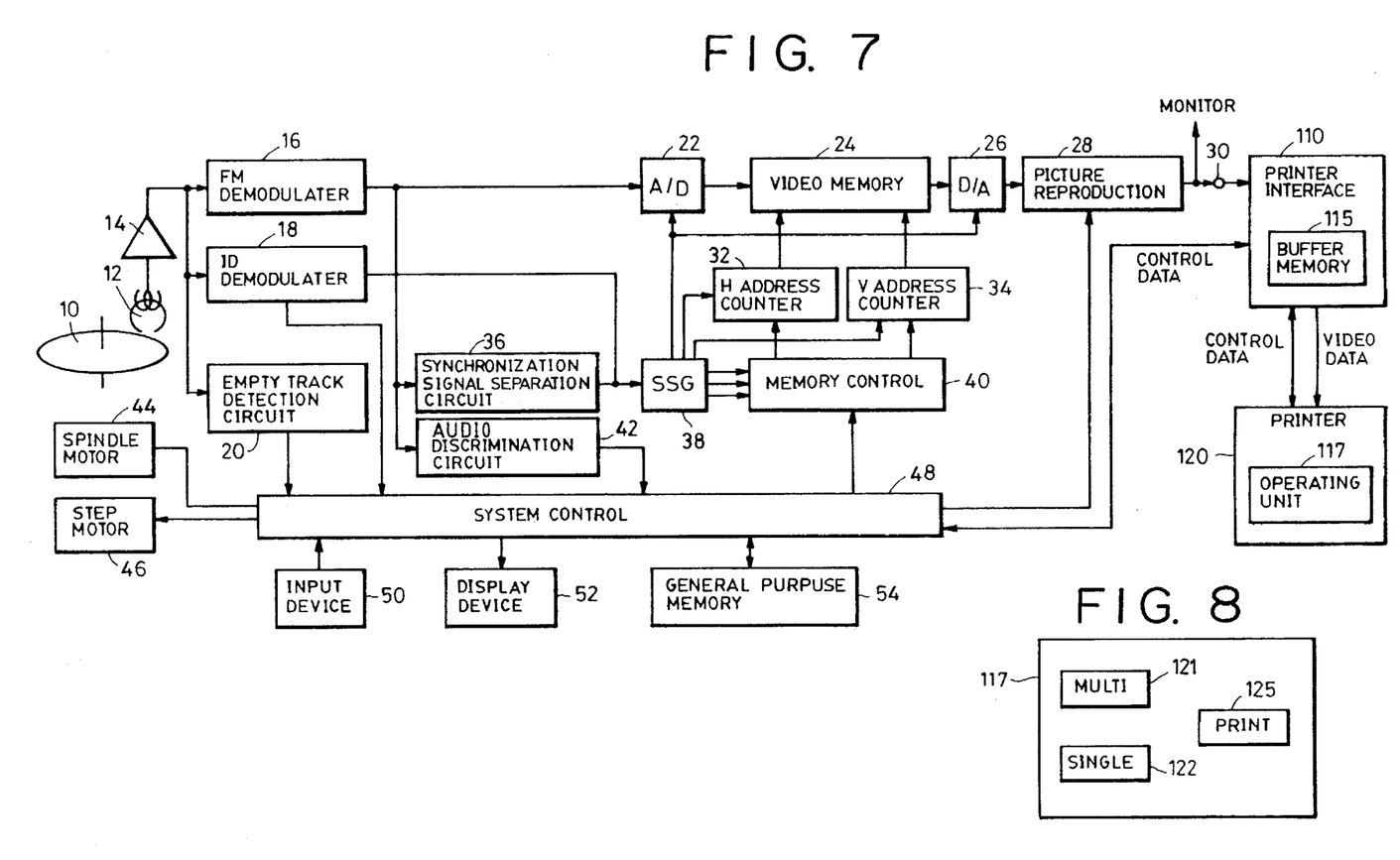
FIG. 7 is a block diagram of a second embodiment of the present invention.
FIG. 8 shows the essential parts of an operating unit 117 of FIG. 7.

In FIG. 7, a reference numeral 110 denotes an interface circuit between the apparatus shown in FIG. 1 and a printer 120. The interface circuit 110 contains a buffer memory 115 in order to accommodate the difference in the rate at which data is read out from the video memory 24 and at which the printer performs printing.

As shown in FIG. 8, the printer 120 has an operating unit 117 which includes a switch 121 for designating a multi-picture screen, a switch 122 for designating a single screen, and a printing instruction switch 125 for designating a desired printing mode. The signal generated in accordance with the operation of the operating unit 117 of the printer 120 is input to the system control circuit 48 through the printer interface 110.

Figure 9:
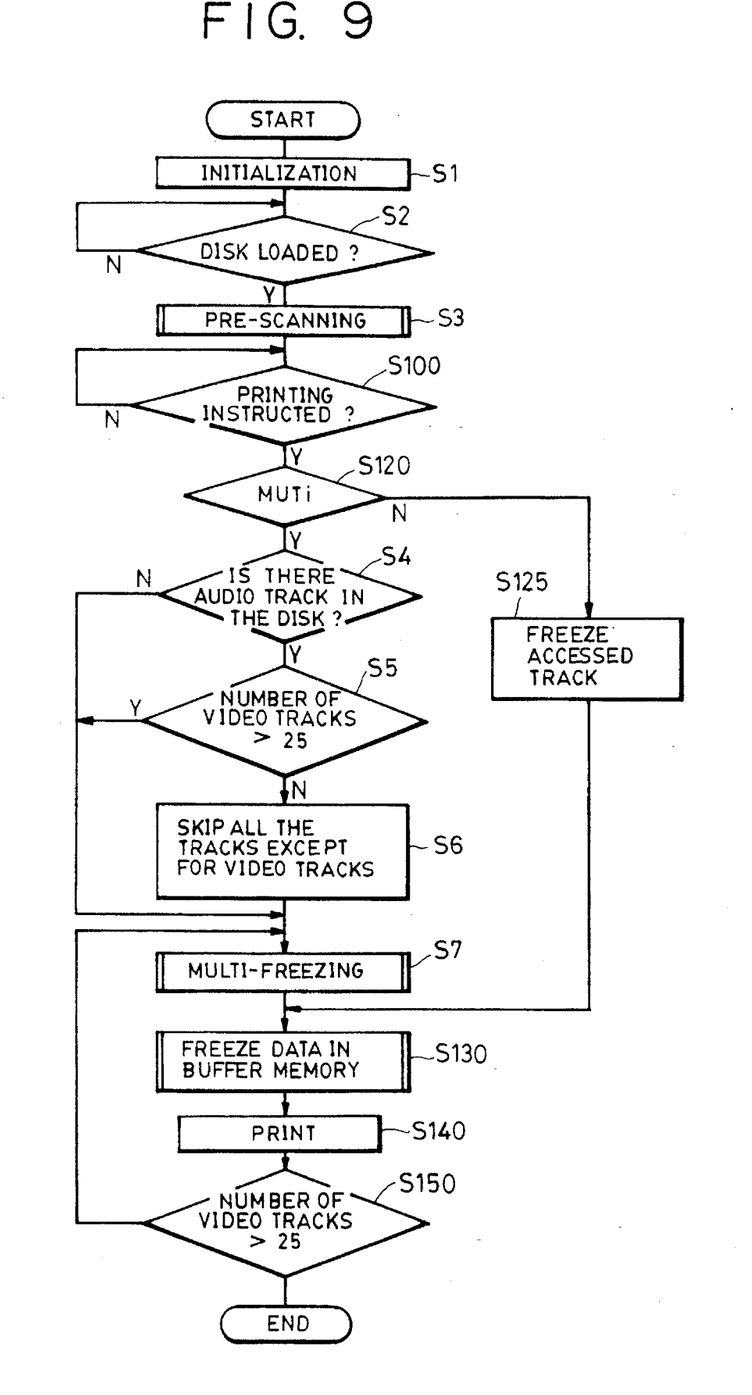
FIG. 9 is a flowchart showing the operation of the second embodiment of the present invention.

The operation of the second embodiment will be described with reference to FIG. 9. In FIG. 9, the same numbers are used to denote steps which are the same as those in FIG. 2, description thereof being omitted.

In FIG. 9, when a printing instruction is input to the system control circuit 48 from the operating unit 117 of the printer 120 through the printer interface 110, the system control circuit 48 determines from the state of the switch 121 whether or not the operation mode is the multi mode (in which printing of a multi-picture screen is conducted) or a single mode. If the operation mode is the multi mode, the processes from steps 4 to 7 shown in FIG. 2 are executed. If the operation mode is not the multi mode, the process goes to step S125 where the image data recorded on the track on which the magnetic head is accessing at that time is frozen in the video memory 124 (S125). Subsequently, the data is stored in the buffer memory 115 in the printer interface 110 (S130), and a printing permission signal is then output to the printer 120 to perform printing by means of the printer 120 (S140). In step S150, it is determined whether or not the number of video tracks on the disk is more than 25. If the answer is yes, a video signal recorded on a track on which printing is not yet performed is stored in the memory (S7), and printing is performed again.

As stated above, it is possible according to the second embodiment to set the desired printing mode at the printer unit. This is convenient for printing.

As will be understood from the foregoing description, in the present invention, the multi-picture screen contains twenty-five pictures in total, five pictures in each row and five pictures in each column. When the number of video signals recorded on the disk is more than 25, the signals recorded on all the tracks are stored in the memory 54 including those recorded on the tracks other than the video track. On the other hand, when the number of video signals is 25 or less and when the signals other than the video signal are recorded, the tracks on which the signals other than the video signal are recorded are skipped and the signals recorded on the video tracks are stored in the memory 54. It is however to be noted that the tracks on which the signals other than the video signal are recorded are muted and stored in the memory 54.

In consequence, when the number of video signals is more than 25, the signals including those other than the video signal are stored in the memory 54, by which the recorded state of the individual tracks on the disk, i.e., what type of signal is recorded on each track on the disk, can be easily checked.

Furthermore, when the number of video signals is 25 or less, all the video signals on the disk are reproduced on one multi-picture screen regardless of the form in which signals are recorded on the tracks on the disk. This makes checking of the video signals on the disk easy.

The individual components shown in outline or designated by blocks in the Drawings are all well-known in the reproduction arts and their specific construction and operation are not critical to the operation or best mode for carrying out the invention.

What is claimed is:

1. A reproducing apparatus for reproducing signals from a recording medium on which (i) video signals and (ii) signals other than video signals are recorded in a positionally arbitrary state, comprising:

discrimination means for discriminating said video signals from said signals other than said video signals recorded on the medium; and means for (i) generating screen information containing video signals of a plurality of pictures on the basis of an output from said discrimination means, and (ii) generating no screen information corresponding to the signals other than video signals.

2. The reproducing apparatus according to claim 1, wherein the signals other than said video signals comprise audio signals.

3. The reproducing apparatus according to claim 1, further comprising means for outputting the multi-picture screen information produced by said control means.

4. The reproducing apparatus according to claim 1, wherein said medium comprises a disk-like medium.

5. The reproducing apparatus according to claim 1, further comprising a memory for sequentially storing the video signals representing a plurality of pictures which are discriminated by said discrimination means.

6. The reproducing apparatus according to claim 5, further comprising means for reading out the video signals representing a plurality of pictures from said memory substantially simultaneously.

7. A reproducing apparatus comprising:

means for discriminating a plurality of a predetermined type of signal from among a plurality of different types of signals recorded on a medium;

a memory for storing at least one said predetermined type of signal; and means for controlling a storage process of said memory in accordance with the discrimination made by said discrimination means, said controlling means controlling the storage process so as to shift a screen location of said predetermined type of signal to a screen location of a signal other than said predetermined type of signal.

8. The reproducing apparatus according to claim 7, wherein said predetermined type of signal comprises a video signal.

9. The reproducing apparatus according to claim 7, wherein said controlling means skips storage of signals other than said predetermined type of signal and stores said predetermined type of signal in said memory when a number of said predetermined type of signal determined by said determination means is more than a predetermined value.

10. The reproducing apparatus according to claim 7, further comprising means for reading-out signals stored in said memory substantially simultaneously.

11. The reproducing apparatus according to claim 10, further comprising means for printing the signals read out by said reading-out means in the form of a visible image.

12. An apparatus comprising:

input means for sequentially receiving in a predetermined order video data and data other than video data;

discrimination means for discriminating the type of data received by said input means; and memory means for extracting the video data from the data received by said input means on the basis of the result of the discrimination performed by said discrimination means, and for storing the video data, said memory means storing the video data sequentially in an order corresponding to the order of reception of said video data independent of the order of reception of said video data and the data other than the video data.

13. Apparatus according to claim 12, wherein said data other than video data comprises audio data.

14. An apparatus comprising:

input means for sequentially inputting first data concerning an image and second data concerning audio;

extracting means for extracting the first data;

generating means for generating screen information for display using a plurality of the extracted first data, the screen information excluding said second data.

15. Apparatus according to claim 14, wherein said input means comprising pickup means for reproducing the first and second data from a recording medium.

16. Apparatus according to claim 15, wherein the recording medium comprises a magnetic disk.

17. Apparatus according to claim 16, wherein said pickup means comprises a magnetic head.

\* \* \* \* \*

UNITED STATES PATENT AND TRADEMARK OFFICE
CERTIFICATE OF CORRECTION

PATENT NO. : 5,561,650
DATED : October 1, 1996
INVENTOR(S) : Youichi Yamagishi

It is certified that error appears in the above-indentified patent and that said Letters Patent is hereby corrected as shown below:

Title page, item [56], under Foreign Patent Documents, line 5, should be--
1 - 35771  2/1989  Japan--.

Drawings:
Figure 2,
    "IS' should read --are--.
Figure 7,
    "PURPUSE" should read --PURPOSE--.
Column 3,
    line 10, "sound,)" should read --sound),--.
Column 4,
    line 4, "per-formed" should read --performed--.
Column 7,
    line 2, "reading-out" should read --reading out--.
Column 8,
    line 6, "data;" should read --data; and--.

Signed and Sealed this

Eleventh Day of March, 1997

Attest:

BRUCE LEHMAN

*Attesting Officer*  Commissioner of Patents and Trademarks